(12) United States Patent
Bonshor

(10) Patent No.: US 7,566,035 B2
(45) Date of Patent: *Jul. 28, 2009

(54) ADJUSTABLE MOUNTING BRACKET ASSEMBLY FOR EXTERIOR SIDING

(75) Inventor: David James Bonshor, Surrey (CA)

(73) Assignee: Tapco International Corporation, Wixom, MI (US)

( * ) Notice: Subject to any disclaimer, the term of this patent is extended or adjusted under 35 U.S.C. 154(b) by 222 days.

This patent is subject to a terminal disclaimer.

(21) Appl. No.: 11/467,656

(22) Filed: Aug. 28, 2006

(65) Prior Publication Data

US 2007/0044401 A1 Mar. 1, 2007

Related U.S. Application Data

(60) Provisional application No. 60/712,523, filed on Aug. 31, 2005.

(51) Int. Cl.
*A47F 5/08* (2006.01)
(52) U.S. Cl. .................. 248/205.1; 248/906; 52/60; 52/97; 174/67
(58) Field of Classification Search .......... 52/60, 52/61, 97, 204.54, 209, 220.8, 302.1, 199, 52/212, 473, 716.2; 248/205.1, 906; 174/67
See application file for complete search history.

(56) References Cited

U.S. PATENT DOCUMENTS

| | | | |
|---|---|---|---|
| 2,777,405 A | 1/1957 | Ager | |
| 4,112,691 A | 9/1978 | Ebeling et al. | |
| 4,381,063 A | 4/1983 | Leong | |
| 4,391,068 A | 7/1983 | Kosar | |
| 4,646,488 A | 3/1987 | Burns | |
| 4,726,152 A | 2/1988 | Vagedes et al. | |
| 4,875,318 A | 10/1989 | MacLeod et al. | |
| 4,920,708 A * | 5/1990 | MacLeod et al. | 52/60 |
| 4,956,948 A | 9/1990 | Hart | |
| 5,000,409 A | 3/1991 | MacLeod et al. | |
| 5,018,333 A | 5/1991 | Bruhm | |
| 5,133,165 A * | 7/1992 | Wimberly | 52/220.8 |
| 5,303,522 A | 4/1994 | Vagedes | |
| 5,326,060 A | 7/1994 | Chubb et al. | |
| 5,369,922 A * | 12/1994 | Hansen | 52/204.54 |
| 5,397,093 A | 3/1995 | Chubb et al. | |
| 5,549,266 A * | 8/1996 | Mitchell et al. | 248/205.1 |

(Continued)

OTHER PUBLICATIONS

Nurenberg et al., U.S. Appl. No. 12/147,305, filed Jun. 27, 2008, 56 pages.

(Continued)

*Primary Examiner*—Robert J Canfield
*Assistant Examiner*—James J Buckle, Jr.
(74) *Attorney, Agent, or Firm*—Howard & Howard Attorneys PLLC

(57) ABSTRACT

A self-adjusting base member preferably of a mounting bracket assembly is utilized in conjunction with exterior siding that covers sheathing of an exterior wall. The base member of the assembly has a mounting flange secured to the sheathing and a wall arrangement that projects outward with respect to the sheathing and from the mounting flange. Preferably, the wall arrangement supports a raised central panel used for mounting of fixtures. Spaced radially outward from the wall arrangement is at least one flexible drip ledge of the base member. The drip ledge is generally self-adjusting with respect to the thickness of the adjacent siding.

26 Claims, 6 Drawing Sheets

U.S. PATENT DOCUMENTS

| | | | |
|---|---|---|---|
| 5,594,206 | A | 1/1997 | Klas et al. |
| 5,675,940 | A | 10/1997 | Bahar et al. |
| 5,722,208 | A | 3/1998 | Humphrey et al. |
| 5,918,431 | A | 7/1999 | Scheidegger et al. |
| 6,070,375 | A | 6/2000 | Anderson et al. |
| 6,076,310 | A | 6/2000 | Kim |
| 6,098,343 | A | 8/2000 | Brown et al. |
| 6,119,416 | A * | 9/2000 | Larson ................. 52/212 |
| 6,151,838 | A | 11/2000 | Husein |
| 6,155,008 | A | 12/2000 | McKee |
| 6,429,371 | B2 | 8/2002 | Scheidegger et al. |
| 6,553,735 | B1 | 4/2003 | Wang Chen |
| D475,440 | S | 6/2003 | Sawyer |
| 6,610,927 | B2 | 8/2003 | Dinh et al. |
| 6,780,100 | B1 | 8/2004 | Gretz |
| 6,825,414 | B2 | 11/2004 | Vagedes |
| 6,904,725 | B1 | 6/2005 | Hansen et al. |
| 6,951,081 | B2 * | 10/2005 | Bonshor ................. 52/97 |
| RE38,881 | E | 11/2005 | Chubb et al. |
| 7,096,627 | B2 | 8/2006 | Wade |
| 7,107,736 | B2 * | 9/2006 | Barnard ................. 52/745.15 |
| 7,408,111 | B2 | 8/2008 | Clark et al. |
| 2001/0015281 | A1 | 8/2001 | Scheidegger et al. |
| 2003/0041539 | A1 | 3/2003 | Bernacki et al. |
| 2003/0136060 | A1 * | 7/2003 | Bonshor ................. 52/97 |
| 2006/0213132 | A1 | 9/2006 | Bonshor |
| 2006/0260216 | A1 | 11/2006 | Bonshor |
| 2006/0261636 | A1 | 11/2006 | Bonshor |
| 2006/0277857 | A1 | 12/2006 | Bonshor |
| 2007/0044393 | A1 | 3/2007 | Bonshor |
| 2007/0044401 | A1 | 3/2007 | Bonshor |
| 2007/0175168 | A1 | 8/2007 | Bonshor |
| 2008/0149792 | A1 | 6/2008 | Nurenberg et al. |

OTHER PUBLICATIONS

Bonshor, U.S. Appl. No. 12/390,154, filed Feb. 20, 2009, 12 pages.

* cited by examiner

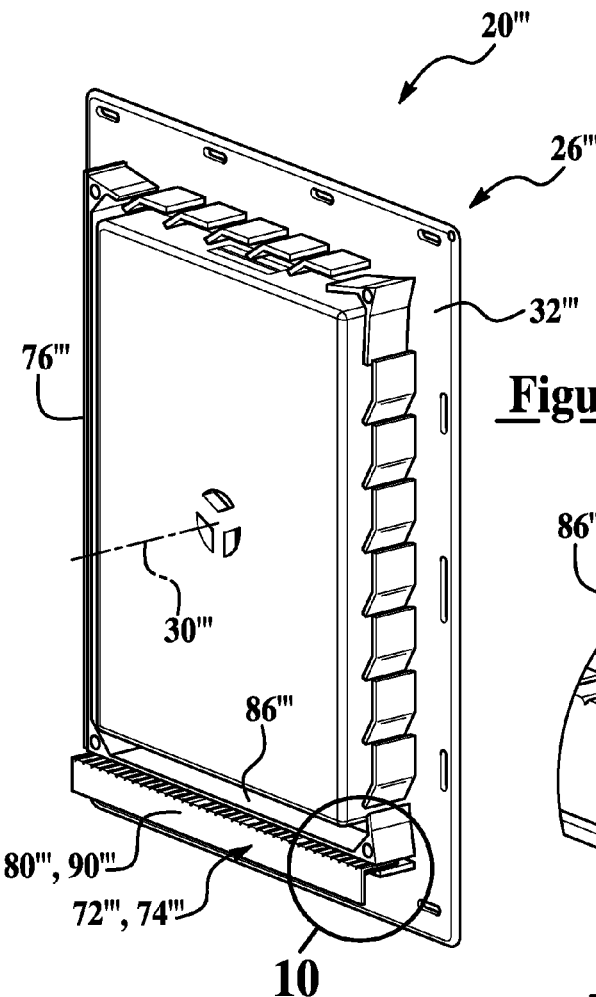
_Figure 9_
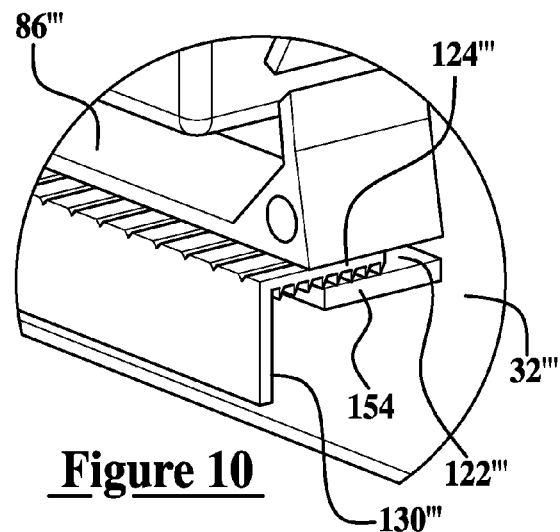
_Figure 10_
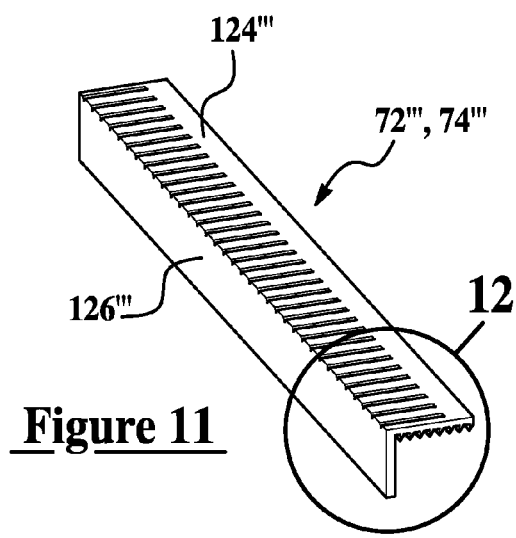
_Figure 11_
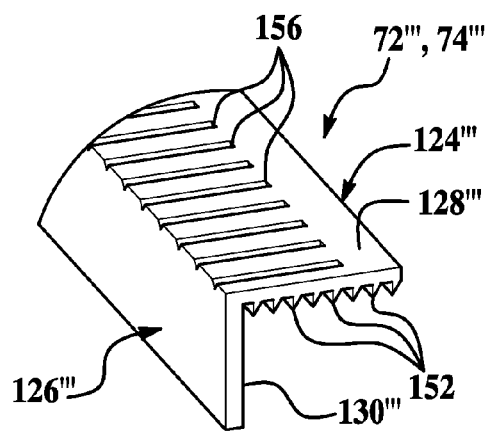
_Figure 12_

US 7,566,035 B2

ADJUSTABLE MOUNTING BRACKET ASSEMBLY FOR EXTERIOR SIDING

FIELD OF THE INVENTION

The subject invention generally relates to an exterior siding mounting bracket assembly and more particularly to a self adjusting mounting bracket assembly.

BACKGROUND OF THE INVENTION

Common in residential building structures, sheathing of an exterior wall is known to be covered with a siding material typically made of cedar, aluminum, plastic or other synthetic material often made to appear like wood. Often, various exterior appendages of the home such as cloths dryer vents, exterior light fixtures, electrical outlets, and water spigots must be trimmed-out around the siding for aesthetic reasons. This is commonly done with a mounting bracket. One such example of a known mounting bracket is taught in U.S. Pat. No. 4,920,708, assigned to the same assignee as the present invention and incorporated herein by reference in its entirety. The known mounting bracket has an internal base member that snap fits to an external trim member along an axis disposed perpendicular to the sheathing and during assembly. The base member has a continuous flange that projects radially outward and is typically nailed to the sheathing under the siding. Projecting axially or laterally outward from the flange and to an inner central panel is a continuous wall. Generally, the wall defines the perimeter of the central panel. A cutout communicates through the panel and has a shape generally dictated by the appendage projecting through it.

The trim member typically has a continuous partition that projects laterally and axially inward toward the base member, and an aesthetically pleasing flange that projects radially outward from the partition. An opening is generally defined by the partition and receives the wall and central panel when the bracket is assembled. The partition is generally shaped to conform with the wall. Multi-positional snap fit features are known to be carried between a radially outward surface of the wall and a radially inward surface of the partition. When the bracket is assembled, the close proximity of the partition to the wall causes the feature to lock the partition and wall together.

During construction of the building, once the base member is secured to the wall or sheathing, the siding material is installed over the sheathing and over the flange. The siding, however, must be trimmed so that it is slightly spaced from the continuous wall of the base member. This spacing allows room for entry of the continuous partition of the trim piece, yet is close enough to the wall of the bracket so that the ends are aesthetically concealed by the outer flange of the trim member which is substantially flush to the siding. Unfortunately, the siding is typically exposed to rain or water which flows down the siding and beneath the exterior flange. This water can accumulate and seep beneath the concealed ends of the siding and against the mounting flange of the base member. Accumulation of water directly against the mounting flange can cause water propagation outward from the wall of the base member and beyond the mounting flange, thus exposing the sheathing to moisture. The retained moisture can potentially create a host of problems including the rot of wood, disintegration of simulated materials and the attraction of unwanted insects.

To reduce or eliminate this water seepage, various bracket assemblies are known to be self-flashing for diverting water run-off away from the sheathing. One such bracket is taught in U.S. Patent Application Publication No. 2003/0136060 A1, published Jul. 24, 2003 and incorporated herein by reference in its entirety. Unfortunately, most known self-flashing bracket assemblies can be mounted in one position only. Particularly, oblong or rectangular bracket assemblies must be separately manufactured with distinct features for horizontal and vertical orientations. This requires separate manufacturing molds/tooling and can complicate shipping and stocking of the product. To reduce manufacturing tooling and stocking of excessive bracket components (i.e. a distinct bracket for vertical mounting and a distinct bracket for horizontal mounting), a bi-directional mounting bracket assembly is disclosed in U.S. patent application Ser. No. 11/459,697, titled "Bi-Directional Mounting Bracket Assembly," assigned to the same assignee as the present invention, and incorporated herein by reference in it's entirety.

Because different types and designs of siding have varying thicknesses, and because it is aesthetically desirable to position the exterior flange substantially flush to the siding, multiple bracket components must still be manufactured generally for each siding thickness, thus multiple manufacturing molds/tooling must be supplied ultimately leading to high manufacturing costs. Although the above referenced "Bi-direction Mounting Bracket Assembly" has directional mounting versatility, it does not have versatility in accepting various siding thicknesses.

Yet further, known bracket assemblies that are adjustable for siding thicknesses require the continuous partition that projects axially inward. This partition adds expense in manufacturing. Moreover, the adjustability of such assemblies is still limited in incremental steps (i.e. three thickness positions).

SUMMARY OF THE INVENTION AND ADVANTAGES

A self-adjusting base member preferably of a mounting bracket assembly is utilized in conjunction with exterior siding that covers sheathing of an exterior wall. The base member of the assembly has a mounting flange secured to the sheathing and a wall arrangement that projects outward with respect to the sheathing and from the mounting flange. Preferably, the wall arrangement supports a raised central panel used for mounting of fixtures. Spaced radially outward from the wall arrangement is at least one flexible drip ledge preferably having a rigid segment and a resiliently flexible segment that generally and adjustably fans out over the surrounding siding.

A bi-directional mounting bracket assembly is utilized in conjunction with exterior siding that covers sheathing of an exterior wall. A base member of the assembly has a mounting flange secured to the sheathing and a continuous wall arrangement that projects outward with respect to the sheathing and from the mounting flange. Preferably, the wall arrangement supports a raised central panel used for mounting of fixtures. The wall arrangement preferably has four walls extending laterally between the mounting flange and the central panel. Spaced radially outward from the two adjacent walls are respective first and second drip ledges, and spaced radially outward from the other two adjacent walls are respective first and second baffle sets. When the assembly is mounted to the sheathing, a selective one of the two drip ledges is disposed substantially horizontally and beneath the wall arrangement for shedding of water. The baffle set adjacent to the horizontal drip ledge cascades water downward and generally toward the respective wall to channel water upon the selected horizontal drip ledge.

Preferably, the wall arrangement of the base member is continuous. Moreover, where a drip ledge does not extend circumferentially about the drip ledge, a baffle set of the base member does so extend. The baffle set functions to cascade water downward and radially inward against the wall arrangement where the water is diverted further downward and upon the drip ledge. An exterior trim member or flange preferably snap fits to the base member for covering the cut edges of the siding, the baffle set, and the drip ledge.

Features, advantages and benefits of the present invention include a mounting bracket assembly having a self adjusting base member that is compatible with a wide range of siding thicknesses. Another advantage includes a resiliently flexible drip ledge that is versatile and can be used with a wide variety of brackets including bi-directional brackets and curved or round brackets. Other advantages include improved water shedding capabilities that eliminates or reduces exposure of the sheathing to moisture that could cause damage to structural material and potentially attract unwanted insects. The assembly reduces or eliminates of structural maintenance, has a design that is relatively simple, robust and versatile, and is inexpensive to manufacture and easy to install.

BRIEF DESCRIPTION OF THE DRAWINGS

Other advantages of the present invention will be readily appreciated as the same becomes better understood by reference to the following detailed description when considered in connection with the accompanying drawings wherein:

FIG. 9 is a perspective view of a fourth embodiment of a base member of a bracket assembly;

FIG. 10 is a partial enlarged view of the base member taken from circle 10 of FIG. 9;

FIG. 11 is a perspective view of a drip ledge of the fourth embodiment of the base member;

FIG. 12 is partial enlarged view of the drip ledge taken from circle 12 of FIG. 11.

DETAILED DESCRIPTION OF THE PREFERRED EMBODIMENT

Figure 13:
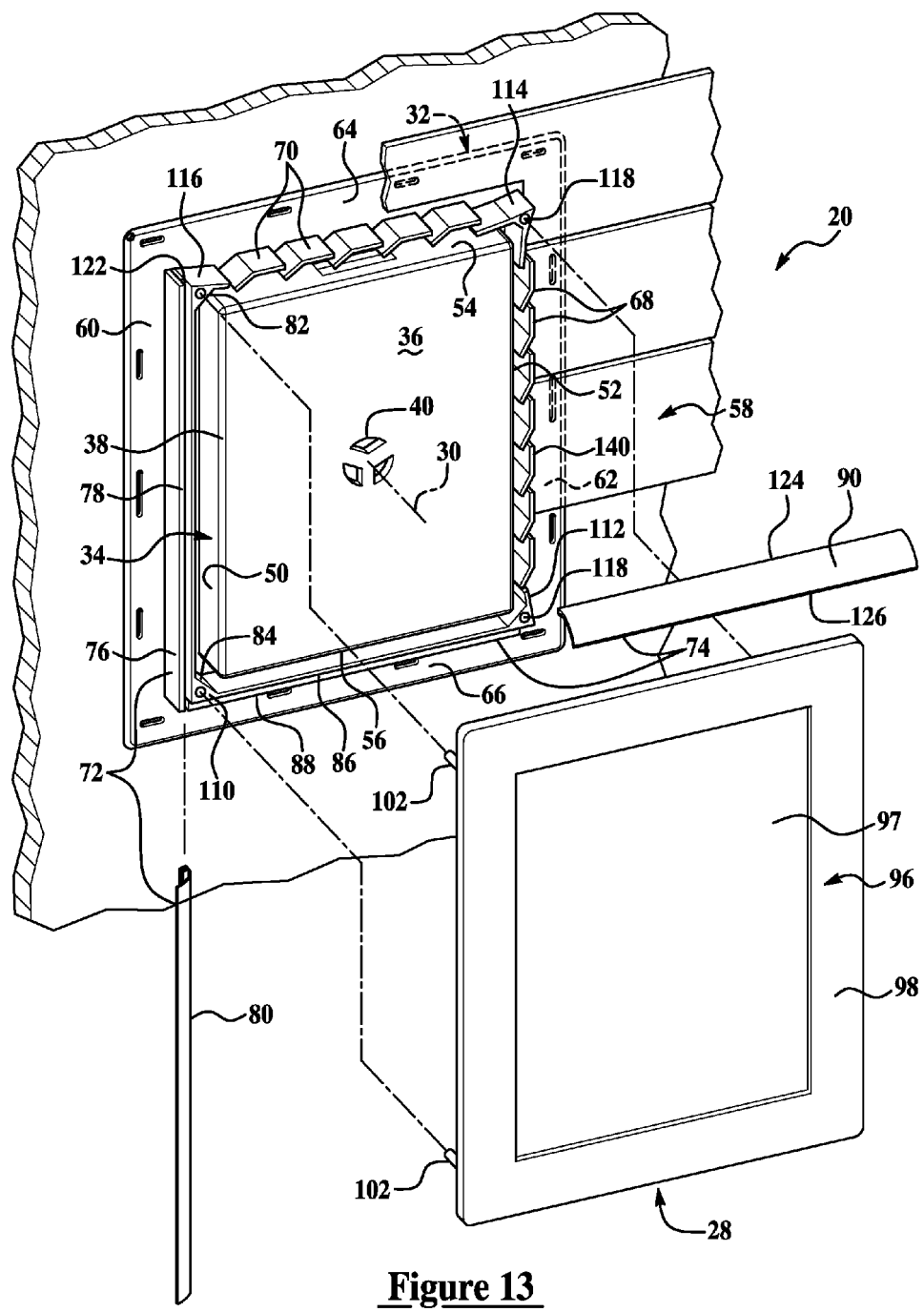
FIG. 13 is an environmental view of the mounting bracket assembly.

As best illustrated in FIGS. 1-4, an adjustable mounting bracket assembly 20 embodying the present invention generally projects or is exposed through exterior siding, shown in FIG. 13, of a substantially vertical wall of any variety of buildings or residential structures exposed to inclement weather such as rain and/or generally water runoff. The assembly 20 provides an aesthetically pleasing surface for which any variety of exterior components can be easily mounted or project therefrom. Such components include but are not limited to hose spigots, electrical receptacles, clothes dryer vents, and light fixtures.

The assembly 20 is fastened to a substructure of the exterior wall preferably sequentially with placement of the siding. The substructure is generally an underlayment or sheathing that is preferably covered by the siding material. The mounting bracket assembly 20 is generally self-flashing for the prevention of water seepage beneath the siding, and has a base member 26 secured to the sheathing and a trim member 28 that preferably snap fits to the base member 26 along an axis 30 preferably disposed substantially perpendicular to the sheathing.

Figure 5:
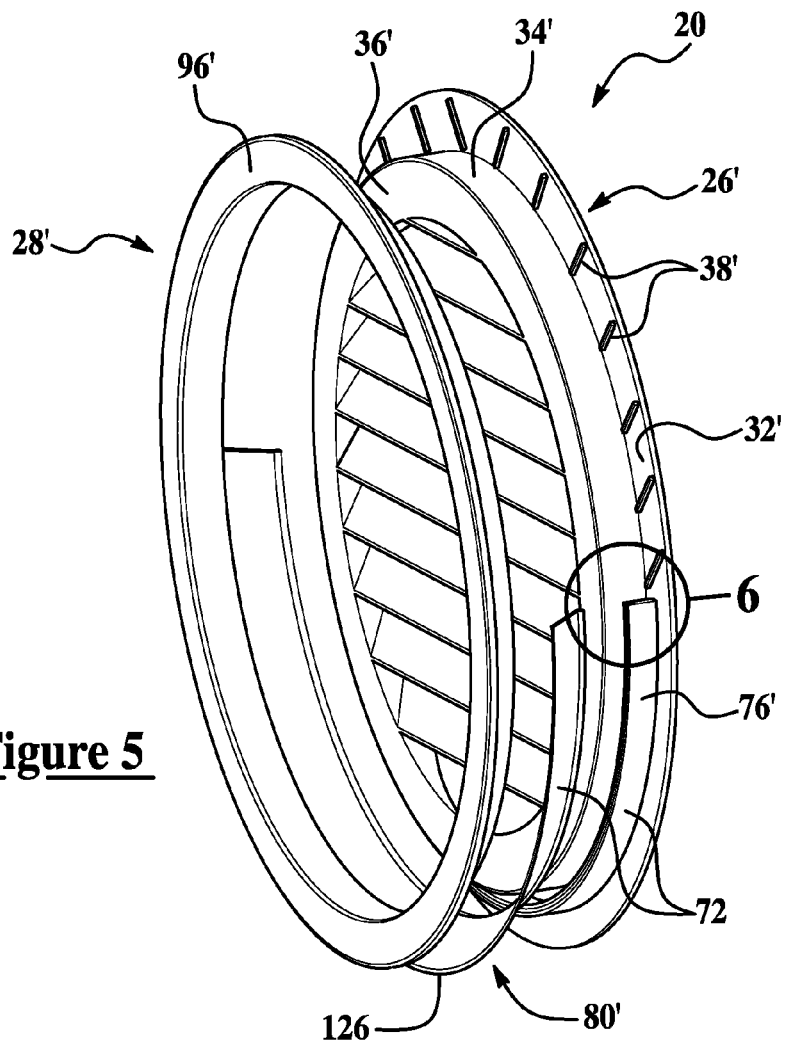
FIG. 5 is an exploded perspective view of a second embodiment of a bracket assembly.
Figure 6:
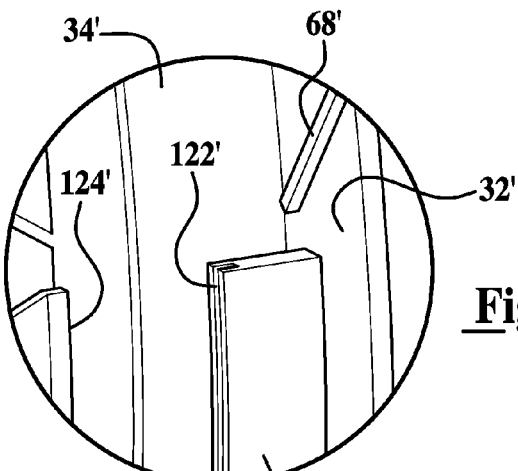
FIG. 6 is an enlarged partial view of the bracket assembly taken from circle 6 of FIG. 5.

The assembly 20 may take the form of any shape. For instance, the assembly 20 or modified assembly 20" may be rectangular and have bi-directional mounting characteristics as illustrated in FIGS. 1-3 and FIGS. 7-10 respectively, or yet another modified assembly 20' may be round as illustrated in FIGS. 5-6, and thus may not need bi-directional mounting characteristics.

Figure 1:
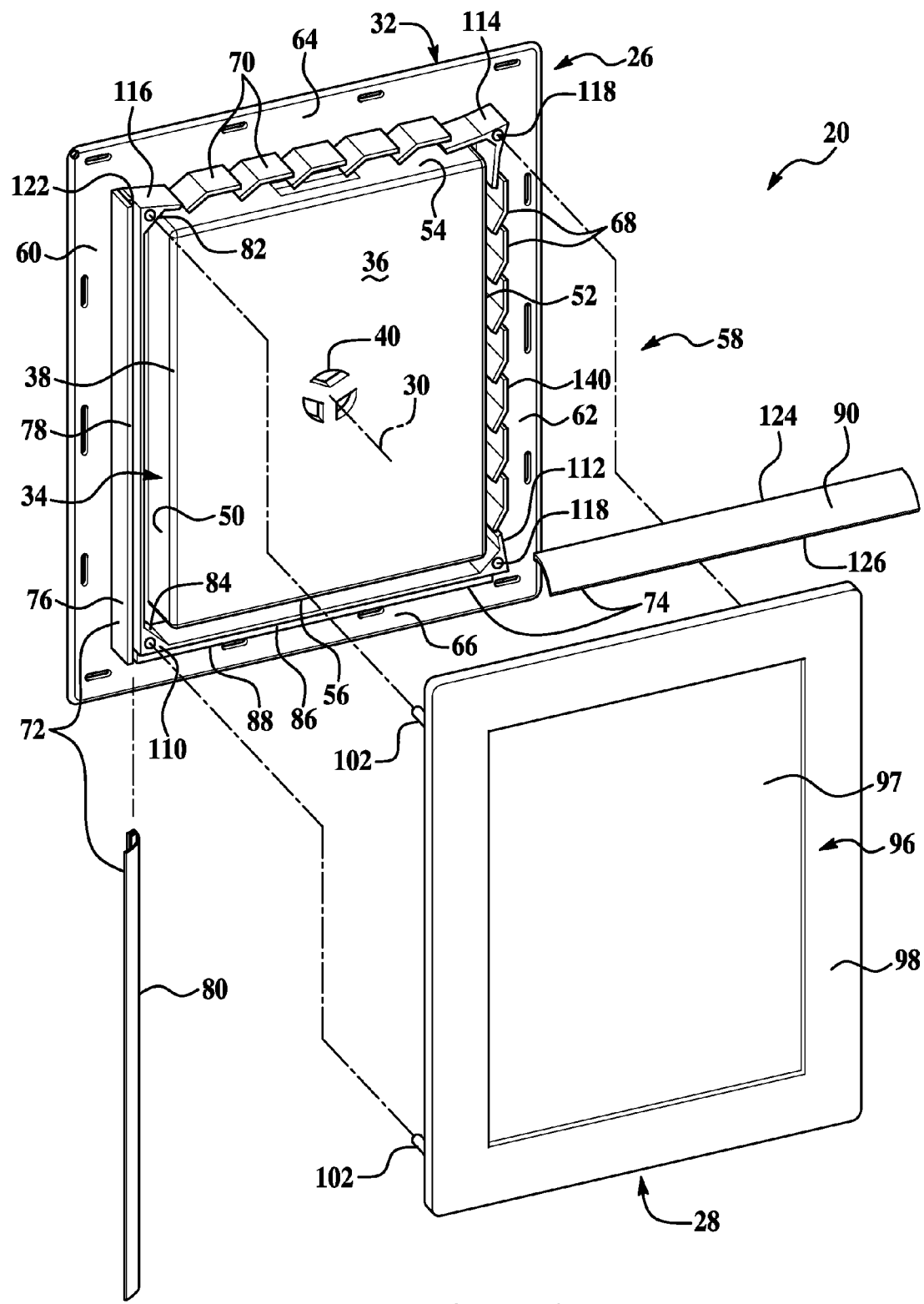
FIG. 1 is an exploded perspective view of a mounting bracket assembly embodying the present invention.
Figure 2:
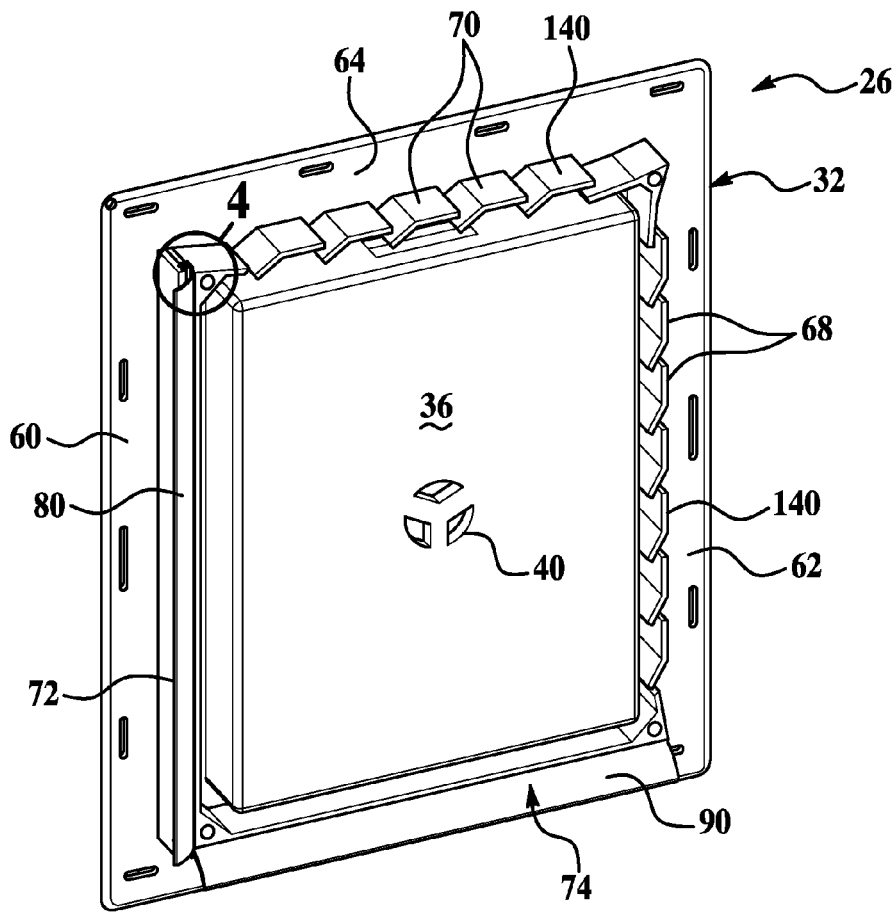
FIG. 2 is a perspective view of a base member of the mounting bracket assembly.
Figure 3:
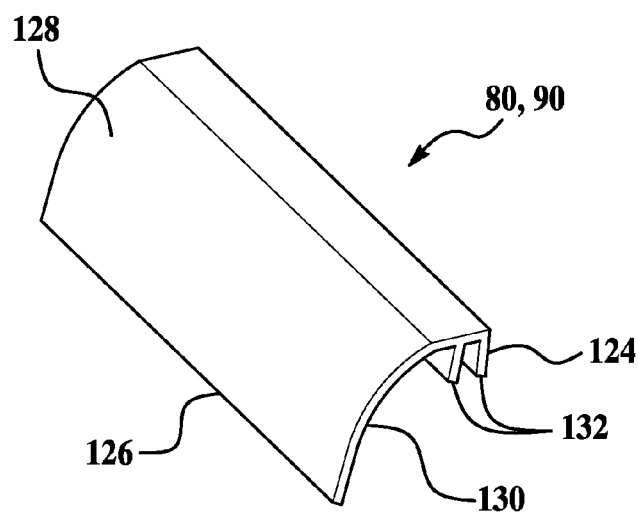
FIG. 3 is a perspective view of a fanned segment of a drip ledge of the base member.

Referring to FIGS. 1-3, the base member 26 may generally be a rectangular shape (as oppose to square or round) and can be mounted in two selective positions, preferably vertical or horizontal. The base member 26 has a mounting flange 32 and a rectangular wall arrangement 34 (see FIGS. 4-6). The flange 32 projects radially outward from the wall arrangement 34 and is typically nailed to the sheathing. The wall arrangement 34 projects axially or laterally outward from the flange 32 and preferably to a radially inward and rectangular facial or central panel 36 spaced from and orientated substantially parallel to the underlayment. Generally, the central panel 36 is that portion of the base member 26 that is exposed through the siding. The wall arrangement 34 spans axially outward to a substantially rectangular perimeter 38 of the central panel 36. At least one cutout or relief feature 40 preferably communicates through the panel 36 and may have a shape generally dictated by the component or appendage projecting through it (not shown).

Preferably the rectangular wall arrangement 34 of the base member 26 has a first wall 50, a second wall 52, a third wall 54 and a fourth wall 56. When the assembly 20 is in a vertical position 58 (i.e. the first and second walls 50, 52 are longer than the third and fourth walls 54, 56) and as illustrated in FIG. 1, the first and second walls 50, 52 are substantially vertical, thus being left and right side walls, respectively. Similarly, the third and fourth walls 54, 56 are substantially horizontal, thus being top and bottom walls, respectively. The flange 32 of the base member 26 has a left portion 60 associated with the left side wall 50, a right portion 62 associated with the right side wall 52, a top portion 64 associated with the top wall 54, and a bottom portion 66 associated with the bottom wall 56. Because the assembly 20 is bi-directional, the base member 26 can be rotated about ninety degrees (counterclockwise as illustrated) moving the assembly from the vertical position as shown in FIG. 1 and to a horizontal position (not shown). When in the horizontal position, the longer first wall 50 is the bottom wall, the longer second wall 52 is the top wall, the shorter third wall 54 is the left side wall and the shorter fourth wall 56 is the right side wall.

Two sets of sloped baffles 68, 70 of the base member 26 are formed to and project axially outward from adjacent portions 62, 64 of the mounting flange 32, respectively. When the assembly 20 is in the vertical position 58, the baffles 68 act to channel water generally radially inward with respect to axis 30 and toward the second wall 52, and baffles 70 are generally not needed at least for the purpose of channel water. When the assembly 20 is in the horizontal position, the baffles 70 act to channel water generally radially inward and toward the third wall 54, and the baffles 68 are generally not needed. Each set of baffles 68, 70 are arranged in a linear fashion generally forming a line that is spaced radially outward from and substantially parallel to respective second and third walls 52, 54 of the rectangular wall arrangement 34.

Projecting laterally outward from the first or left portion 60 and the fourth or bottom portion 66 of the flange 32 are respective drip ledges 72, 74. The elongated drip ledges 72, 74 extend substantially parallel to and are spaced radially outward from respective first and fourth walls 50, 56. Drip ledge 72 has a substantially rigid shelf segment 76 engaged directly to the left portion 60 of the flange 32 and projecting laterally outward therefrom to a drip edge 78. Projecting laterally outward from the drip edge 78 and radially outward with respect to axis 30 is a self-adjustable and preferably resiliently flexible fanned segment or insert 80 of the drip ledge 72. Contiguous to the ends of the shelf segment 76 and the left portion 60 are respective end dams 82, 84 for diverting water over the drip edge 78 when the assembly 20 is in the horizontal position. Similarly, the drip ledge 74 has a substantially rigid shelf segment 86 engaged directly to the bottom portion 66 of the flange 32 and projecting laterally outward therefrom to a drip edge 88. Projecting laterally outward from the drip edge 88 and radially outward with respect to axis 30 is a resiliently flexible fanned segment or insert 90 of the drip ledge 74. Contiguous to the ends of the shelf segment 86 and the bottom portion 66 are respective end dams 84, 94 for diverting water over the drip edge 88 when the assembly 20 is in the vertical position.

The trim member 28 has an exterior flange 96 that defines a substantially rectangular hole 97 contoured to accept the central panel 36 of the base member 26. The flange 96 has an external surface 98 designed to be aesthetically pleasing and an internal surface (not shown) that faces in an axial inward direction with respect to the axis 30. Located proximate to each of four corners of the exterior flange 96 and projecting in an axial inward direction with respect to axis 30 and from the internal surface are four pins 102. Each of the four pins 102 are associated with respective bosses 110, 112, 114, 116 of the base member 26 each having a bore 118 for snug or locking receipt of the associated pins 102 when the assembly 20 is assembled. Preferably, boss 110 carries end dam 84 of drip ledge 72 and of drip ledge 74; boss 112 carries end dam 94 of drip ledge 74; boss 114 is generally a corner fitting between baffle sets 68, 70; and boss 116 carries end dam 82 of drip ledge 72.

Figure 4:
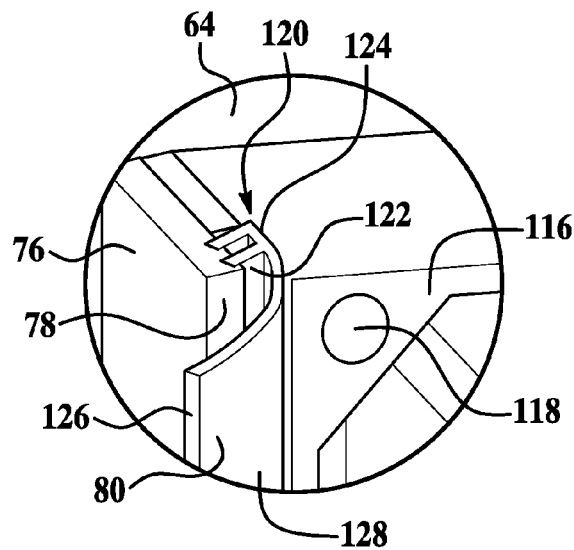
FIG. 4 is an enlarged partial view of the base member taken from circle 4 of FIG. 3.

The flexible fanned segments 80, 90 of the respective drip ledges 72, 74 are initially formed or manufactured separate from the respective rigid first segments 76, 78 that are preferably made of injection molded plastic and formed unitarily to the mounting flange 32. Each ledge 72, 74 has an attachment feature 120 (as best shown in FIG. 4) carried between the first segments 76, 78 and respective fanned segments 80, 90. Preferably, the attachment feature 120 is a press fit feature and has a channel 122 and an enlarged or barbed base edge or insertion member 124. Preferably, the channel 122 is carried by the drip edges 78, 88 of the respective rigid first segments 76, 86. The base edge 124 is then part of the flexible fanned segments 80, 90. Generally, the segments 80, 90 span laterally between the base edge 124 and a distal edge or distal member 126 of the fanned segments 80, 90.

The flexible second segments 80, 90 each have an outward face 128 and an inward face 130. Preferably, the outward face 128 is convex and the inward face is concave so that the distal edge 126 is orientated generally over and spaced from the siding prior to attaching the trim member 28 to the base member 26. This simplifies installation and assures proper flexing or bending of the segments 80, 90 when the trim member 28 is press fitted in place. Preferably, each base edge 124 carries two parallel and spaced apart barbs 132 that project outward from the inward face 130 and press fit into the channels 122. The second segments 80, 80 may be made of a rubberized or synthetic rubber material having adequate resiliency for a press fit into the channels. Alternatively, one skilled in the art would now realize that the base member 26 could be made of similar materials yet from a dual injection molding process thus alleviating the need to assemble the base member 26 manually. Yet further, one skilled in the art would now know that the attachment feature 120 could be any one of a variety of attachment features including an adhesive, or the barbed base edge 124 could be a "bulbed" edge that press fits into a sufficiently shaped channel.

During installation of the assembly 20, the installer first selects the desired vertical or horizontal position. When selected, the installer assures that one of the two drip ledges 72, 74 are near the bottom of the base member 26. The flange 32 of the base member 26 is then fastened or preferably nailed to the sheathing. Preferably the mounting flange 32 has holes for receipt of nails or screws for this attachment.

With the base member 26 secured to the sheathing, the siding is appropriately trimmed during installation placing the siding over the mounting flange 32 and beneath the fanned segments 80, 90 of respective drip ledges 72, 74. The siding is also trimmed so that the cut edges are radially outward from and abut or are substantially near to abutting tabs 140 of each baffle of the baffle sets 68, 70, and abut or are substantially near to the shelf segments 76, 86 of respective drip ledges 72, 74. With the siding installed, the pins 102 of the trim member 28 are aligned to respective bosses 110, 112, 114, 116 and press fitted into respective bores 118. When completely installed, the trim member 28 covers the cut ends of the siding along with the baffle sets 68, 70 and drip ledges 72, 74 of the base member 26 for a pleasing appearance. In addition, the distal edges 126 of the fanned segments 80, 90 are resiliently biased between the siding and the flange 96 of the trim member 28. Preferably, the biasing force of the resiliently flexible material of the fanned segments 80, 90 generally holds the distal edges 126 or the outward face 128 against the inward surface of the flange 96 of the trim member 28. The fit of the pins 102 to the bosses 110, 112, 114, 116 must have sufficient strength to resist this force.

In operation and during inclement weather, water intrusion, or rain water cascading down the siding from above the mounting bracket assembly 20 will flow beneath the exterior flange 96. When the assembly 20 is in the vertical position 58 as illustrated in FIG. 1, the baffle set 70 is generally inactive since gravity will cause water to impinge upon the adjacent top wall 54 regardless of the baffle set's presence. Each baffle of the generally vertical baffle set 68, however, has a sloped blade 142 that projects downward from the abutting tab 140 and toward the left causing the water to cascade downward from one sloped blade 142 to the next and until the water is diverted upon the shelf portion 86 of the drip ledge 74 proximate to the end dam 94. Any water flowing downward upon the first portion 60 of the mounting flange 32 is substantially channeled downward between the vertical shelf segment 76 of the drip ledge 72 and the first wall 50 of the wall arrangement 34 and is diverted upon the shelf segment 86 of the drip ledge 74 by the end dam 92. All water collected upon the shelf segment 86 flows over the drip edge 88 and through any space existing between the fanned segment 90 and the inward surface of the exterior flange 96 and/or outward through either end of the fanned segment 90. If the assembly 20 is mounted in the horizontal position instead of the vertical position 58 as illustrated, operation of the assembly is generally the same except that the functions of the drip ledges 72, 74 are reversed, and the functions of the baffle sets 68, 70 are reversed.

Referring to FIGS. 5-6 a modification of the assembly 20 is illustrated wherein like elements have like identifying numerals except with a prime symbol added. The assembly 20' illustrated preferably has a substantially round shape, and consequently a bidirectional mounting capability is generally not advantageous. The flexibility of a second segment 80' is advantageous for circular forms and permits compound flexing. More particularly, the segment 80' is easily cupped in both a lateral and longitudinal orientation.

Figure 7:
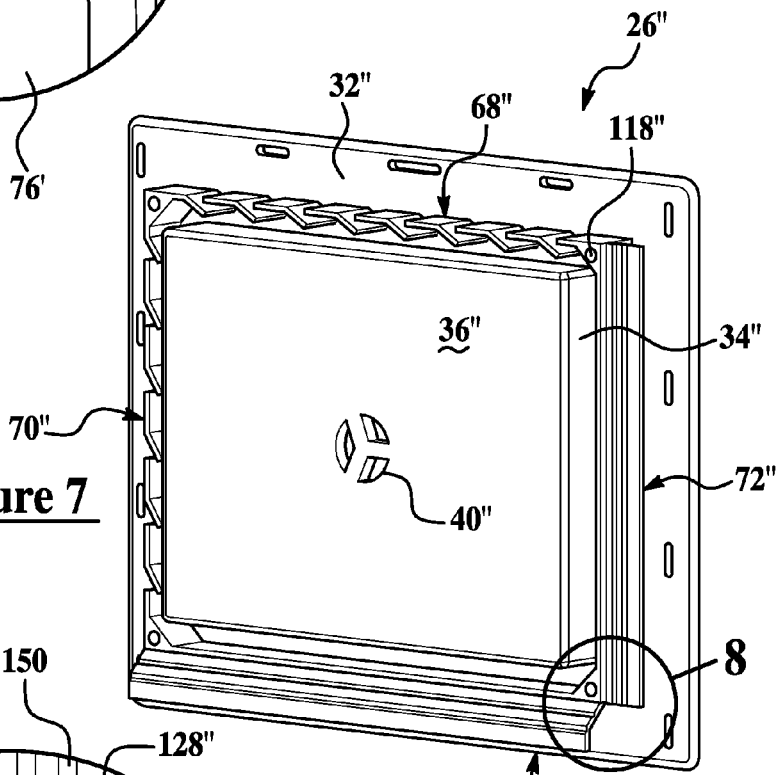
FIG. 7 is a perspective view of a third embodiment of a base member of a bracket assembly.
Figure 8:
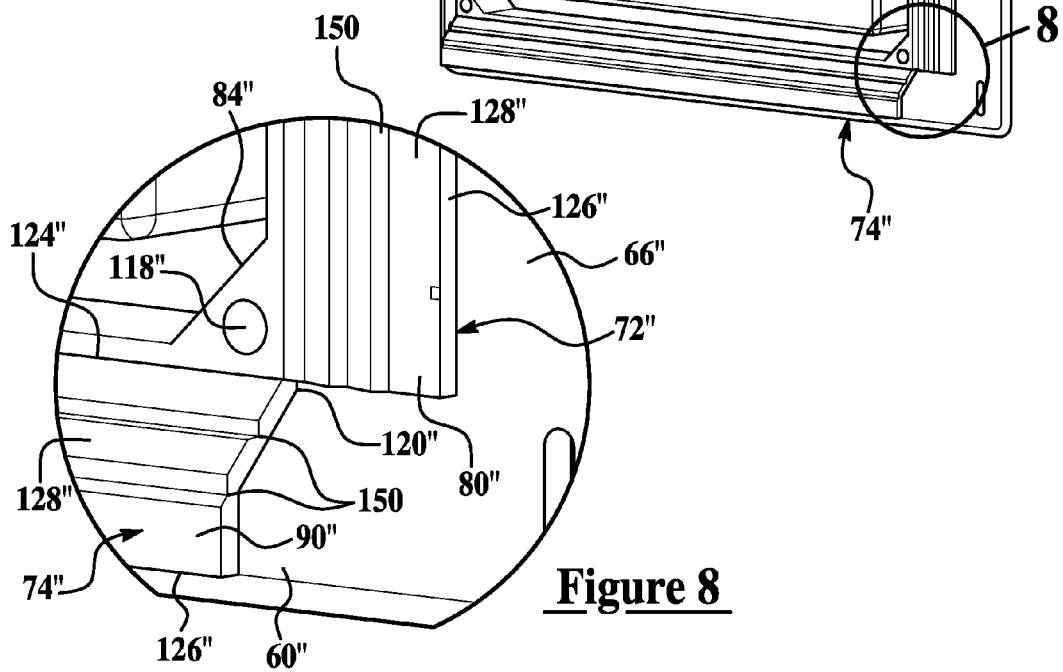
FIG. 8 is an enlarged partial view of the base member taken from circle 8 of FIG. 7.

Referring to FIGS. 7-8, another modification of the assembly is illustrated wherein like elements have like identifying numerals except with a double prime symbol added. The illustrated assembly 20" is similar to assembly 20 because it is bi-directional, self adjusting for siding thickness, and has generally flexible drip ledges 72", 74". The assembly 20" is generally a modification of assembly 20 because the fanned segments 80", 90" are preferably injection molded plastic made as one unitary piece with the remainder of the base member 26". The segments 80", 90" of drip ledges 72", 74" are flexible because they each have a plurality of living hinges 150 preferably carried or defined on the outward faces 128". Moreover and preferably, the attachment feature 120" is also a living hinge and may be carried at least in-part on the inward faces of the fanned segments 80", 90".

Referring to FIGS. 9-12, yet another modification of the assembly is illustrated wherein like elements have like identifying numerals except with a triple prime symbol added. The illustrated assembly 20''' (not shown in totality) is similar to assembly 20 because it is bi-directional and has drip ledges 72''', 74''', of the base member 26''' that are self adjusting for siding thickness. Unlike assembly 20, the segments 80''', 90''' of drip ledges 72''', 74''' are generally not flexible.

The elongated segments 80''', 90''' of drip ledges 72''', 74''' are preferably substantially rigid, made of injection molded plastic, and are generally angular in shape having an insertion member 124''' and a distal or facial member 126'''. The members 124''', 126''' co-extend longitudinally with one another and both carry an inward face 130''' that preferably defines an acute angle of slightly less than ninety degrees. Each drip ledge 72''', 74''' have respective shelf segments 76''', 86''' that project rigidly outward from a flange 32''' of the base member 26'''. A channel 122''' in each shelf segment 76''', 86''' preferably has a depth that extends to the base flange 32'''. The width of the channel 122''' is sufficient to snugly receive the insertion member 124'''.

Preferably, a series of elongated barbs or pointed ribs 152 that co-extend with the longitude of the insertion member 124''' project laterally outward from that portion of the inward face 130''' carried by the insertion member 124'''. The elongated barbs 152 are spaced laterally away from one another and bear upon a plate member 154 of the shelf segment 76''', 86''' located radially outward from the insertion member 124''' and with respect to axis 30''' when the base member 26''' is assembled. Generally, the thinner the siding material, the deeper is the insertion of the member 124''' into the channel 122''' thus the greater the number of barbs 152 that actually contact the plate member 154.

Preferably, a series of elongated grooves 156 are defined by an opposite face 128''' and in the insertion member 124'''. The grooves 156 are spaced laterally away from one-another and each extend axially with respect to axis 30''' for channeling water axially outward, then downward upon one of the facial member 126'''. One skilled in the art would now know that the base member 26''' does not necessarily require two drip ledges 72''', 74'''. For the bi-directional feature of bracket assembly 20''', the assembly may be manufactured with only one drip ledge having a length that is sufficient to co-extend with the longest side or channel of the base member 26''' (i.e. horizontal position). If the base member 26''' is mounted in a vertical position as illustrated, the installer would then be required to cut-off the excess length of the generic drip ledge. One skilled in the art would also now know that the assembly 20''' need not be bi-directional and can be of any shape including a curved or circular shape. Thus, the channel 122''' can be arcuate with a correspondingly curved drip ledge 74'''.

While the forms of the invention herein disclosed constitute presently preferred embodiments many others are possible. It is not intended herein to mention all of the possible equivalent forms or ramifications of the invention. It is further understood that the terms used herein are merely descriptive rather than limiting, in that various changes may be made without departing from the spirit and scope of this invention as defined by the following claims.

What is claimed is:

1. A base member of a mounting bracket assembly used in conjunction with sided exterior walls that have a substantially vertical substructure covered by siding, the base member comprising:
   an axis projecting outward from the substructure;
   a wall arrangement projecting in an axial outward direction with respect to the exterior wall;
   a mounting flange projecting radially outward from the wall arrangement with respect to the axis, wherein the mounting flange is disposed at least in-part beneath the siding;
   an elongated first drip ledge spaced radially outward from and co-extending longitudinally with the wall arrangement, and wherein the drip ledge projects laterally and in an axial outward direction from the mounting flange and extends a distance generally equal to or greater than an adjacent thickness of the siding;
   an elongated first segment of the drip ledge being rigid and projecting laterally and in the axial outward direction from the mounting flange; and
   an elongated second segment of the drip ledge being flexible and projecting at least in-part radially outward to a distal edge.

2. The base member set forth in claim 1 wherein the distal edge is located axially between the siding and a trim member of the bracket assembly.

3. The base member set forth in claim 2 wherein the distal edge is biased between the siding and the trim member.

4. The base member set forth in claim 2 further comprising:
   a drip edge of the first segment;
   an opposite base edge of the second segment;
   an attachment feature carried between the drip edge of the first segment and the base edge.

5. The base member set forth in claim 4 further comprising a channel in the drip edge of the first segment for press-fitted receipt of the base edge.

6. The base member set forth in claim 5 wherein the lateral span of the flexible second segment between the base edge and opposite distal edge is cupped in a natural state.

7. The base member set forth in claim 1 further comprising an elongated second drip ledge orientated perpendicular to the first drip ledge.

8. The base member set forth in claim 7 wherein the base member is bi-directional.

9. The base member set forth in claim 5 wherein the base member is circular.

10. The base member set forth in claim 1 wherein the flexible drip ledge carries a plurality of living hinges.

11. The base member set forth in claim 10 wherein the base member is a singular and one unitary piece.

12. The base member set forth in claim 11 wherein the base member is injection molded plastic.

13. The base member set forth in claim 1 further comprising:
  a channel in the first segment opened axially outward; and
  the flexible second segment of the drip ledge having a horizontal base edge press fitted in the channel and an opposite distal edge, wherein the second segment spans laterally downward to the distal edge.

14. The base member set forth in claim 13 further comprising a plurality of barbs projecting outward from the base edge and disposed at least in-part in the channel for press fitted contact with the first segment.

15. The base member set forth in claim 14 wherein each one of the barbs are spaced axially away from the adjacent barbs of the plurality of barbs.

16. The base member set forth in claim 1 further comprising:
  a channel in the first segment and opened axially outward; and
  the elongated second segment of the drip ledge having an insertion member for a press fit into the channel and a facial member projecting downward from the insertion member for overlapping the siding.

17. The base member set forth in claim 16 further comprising a plurality of elongated barbs projecting downward from the insertion member for a locking fit in the channel.

18. The base member set forth in claim 16 further comprising a plurality of grooves extending axially with respect to the axis for channeling water upon the facial member, and wherein each respective one of the plurality of grooves are spaced laterally away from an adjacent one of the plurality of grooves.

19. A mounting bracket assembly for sided exterior walls that have a substantially vertical substructure covered by siding, the mounting bracket assembly comprising:
  an axis projecting outward from the exterior wall;
  a base member attached to the exterior wall and covered in-part by the siding, the base member having an elongated wall arrangement projecting laterally outward from the substructure and beyond the siding, an elongated and flexible drip ledge co-extending at least in-part with the wall arrangement and spaced radially outward from the wall arrangement;
  the flexible drip ledge spanning laterally outward to a distal edge located at least in-part below the wall arrangement and over the siding;
  a trim member press fitted to the base member, the trim member having a flange that covers the drip ledge with the distal edge disposed directly between the flange and the siding;
  a resiliently flexible second segment of the drip ledge having the distal edge; and
  a rigid first segment of the drip ledge being rigid relative to the resiliently flexible second segment and spanning laterally outward to the second segment.

20. The mounting bracket set forth in claim 19 further comprising an attachment feature of the drip ledge carried between the first and second segments.

21. The mounting bracket set forth in claim 20 wherein the attachment feature is a living hinge.

22. The mounting bracket set forth in claim 21 further comprising a plurality of living hinges carried by and co-extending longitudinally with the second segment for flexibility.

23. The mounting bracket assembly as set forth in claim 19 wherein the base includes a mounting flange projecting radially outward from the wall arrangement with respect to the axis, wherein the mounting flange is disposed at least in-part beneath the siding.

24. The mounting bracket assembly as set forth in claim 23 wherein the drip ledge projects from the mounting flange and extends a distance generally equal to or greater than an adjacent thickness of the siding.

25. A base member of a mounting bracket assembly used in conjunction with sided exterior walls that have a substantially vertical substructure covered by siding, the base member comprising:
  an axis projecting outward from the substructure;
  a wall arrangement projecting in an axial outward direction with respect to the exterior wall;
  a mounting flange projecting radially outward from the wall arrangement with respect to the axis, wherein the mounting flange is disposed at least in-part beneath the siding;
  an elongated first drip ledge spaced radially outward from and co-extending longitudinally with the wall arrangement, and wherein the drip ledge projects laterally and in an axial outward direction from the mounting flange and extends a distance generally equal to or greater than an adjacent thickness of the siding;
  an elongated first segment of the drip ledge projecting laterally and in an outward direction from the mounting flange;
  a channel in the first segment opened axially outward; and
  a flexible second segment of the drip ledge having a horizontal base edge press fitted in the channel and an opposite distal edge, wherein the second segment spans laterally downward to the distal edge.

26. A base member of a mounting bracket assembly used in conjunction with sided exterior walls that have a substantially vertical substructure covered by siding, the base member comprising:
  an axis projecting outward from the substructure;
  a wall arrangement projecting in an axial outward direction with respect to the exterior wall;
  a mounting flange projecting radially outward from the wall arrangement with respect to the axis, wherein the mounting flange is disposed at least in-part beneath the siding;
  an elongated first drip ledge spaced radially outward from and co-extending longitudinally with the wall arrangement, and wherein the drip ledge projects laterally and in an axial outward direction from the mounting flange and extends a distance generally equal to or greater than an adjacent thickness of the siding;
  an elongated first segment of the drip ledge being rigid and projecting laterally and in the axial outward direction from the mounting flange;
  a channel in the first segment and opened axially outward; and
  an elongated second segment of the drip ledge having an insertion member for a press fit into the channel and a facial member projecting downward from the insertion member for overlapping the siding.

* * * * *